Dec. 23, 1969  N. R. REYBURN  3,485,911

METHOD FOR MOLDING PLASTIC ARTICLES

Original Filed May 10, 1965  5 Sheets-Sheet 1

INVENTOR.
NATHANIEL R. REYBURN

BY Philip M. Rice
& W. A. Schaich
ATTORNEYS

Dec. 23, 1969    N. R. REYBURN    3,485,911
METHOD FOR MOLDING PLASTIC ARTICLES
Original Filed May 10, 1965    5 Sheets-Sheet 3

INVENTOR
NATHANIEL R. REYBURN
BY Philip M. Rice
& W. A. Schaich
ATTORNEYS

Dec. 23, 1969 N. R. REYBURN 3,485,911
METHOD FOR MOLDING PLASTIC ARTICLES
Original Filed May 10, 1965 5 Sheets-Sheet 4

INVENTOR.
NATHANIEL R. REYBURN
BY Philip M. Rice
& W. A. Schaich
ATTORNEYS

United States Patent Office 3,485,911
Patented Dec. 23, 1969

3,485,911
METHOD FOR MOLDING PLASTIC ARTICLES
Nathaniel R. Reyburn, Erie, Pa., assignor to Owens-Illinois, Inc., a corporation of Ohio
Original application May 10, 1965, Ser. No. 454,472, now Patent No. 3,357,056, dated Dec. 12, 1967. Divided and this application Sept. 5, 1967, Ser. No. 665,313
The portion of the term of the patent subsequent to Dec. 12, 1984, has been disclaimed
Int. Cl. B28b 11/18, 3/10; B29c 9/00
U.S. Cl. 264—161        2 Claims

ABSTRACT OF THE DISCLOSURE

The invention pertains to a compression molding method for manufacture of double wall laminated plastic cups in which the same mold and plunger are utilized in molding both the inner and outer walls. The invention also pertains to the manufactured article in its preliminary or preform configuration and in its final form state. The mold and plunger utilized in the invention are contoured such that a portion of the cup forming its outer wall adjacent the rim is substantially thinner than the rest of the sidewall in the preform article. The part of the plunger forming this thin wall portion near the rim is connected to the major molding portion of the plunger having an outwardly extending ledge. During molding of the inner wall portion of the final cup article, the plunger is inserted in the mold to such a position that the outwardly extending ledge aligns with the thin outer wall portion at the rim and thereby defining the final rim of the two-ply laminate cup. The invention produces a novel form of two-color or two-material laminated cup-type article.

---

The present application is a divisional of my earlier co-pending application, Ser. No. 454,472, filed May 10, 1965 now Patent No. 3,357,056.

The present invention relates generally to the art of molding plastic articles and, more particularly, to compression molding double wall cup-shaped articles. The present invention also relates to a new and novel article of manufacture and an intermediate first or preformed article of the said new and novel article of manufacture.

In the manufacture of the plastic articles, such as cups and the like, it is frequently desirable to mold the articles in two layers in order to provide a two-color cup with the inside being one color and the outside being another color. One method for molding this type of article is disclosed in U.S. Reissue Patent No. Re. 25,534, dated Mar. 10, 1964.

Heretofore, it has been necessary to use two sets of molds to form double wall cup-like articles. Thus, under the prior art the outer wall is molded in a female mold using one plunger and the inner wall is molded therein using a second plunger. Under the present invention, it is possible to mold such articles using the same plunger to form both the outer and inner wall.

Accordingly, it is an object of the present invention to provide new and efficient method for molding double wall plastic articles.

It is a further object of the present invention to provide a method for molding double wall cup-shaped plastic articles wherein a single set of molds is used for forming both the inner and the outer layers.

It is an additional object of the present invention to provide a plastic article having double walls and characterized in that the outer wall portion at the top or rim of the article is substantially thinner than the outer wall portion of the remainder of the article.

Other objects and advantages of the present invention will become readily apparent from the following detailed description taken in conjunction with the annexed sheets of drawings on which:

Figures 5, 6:
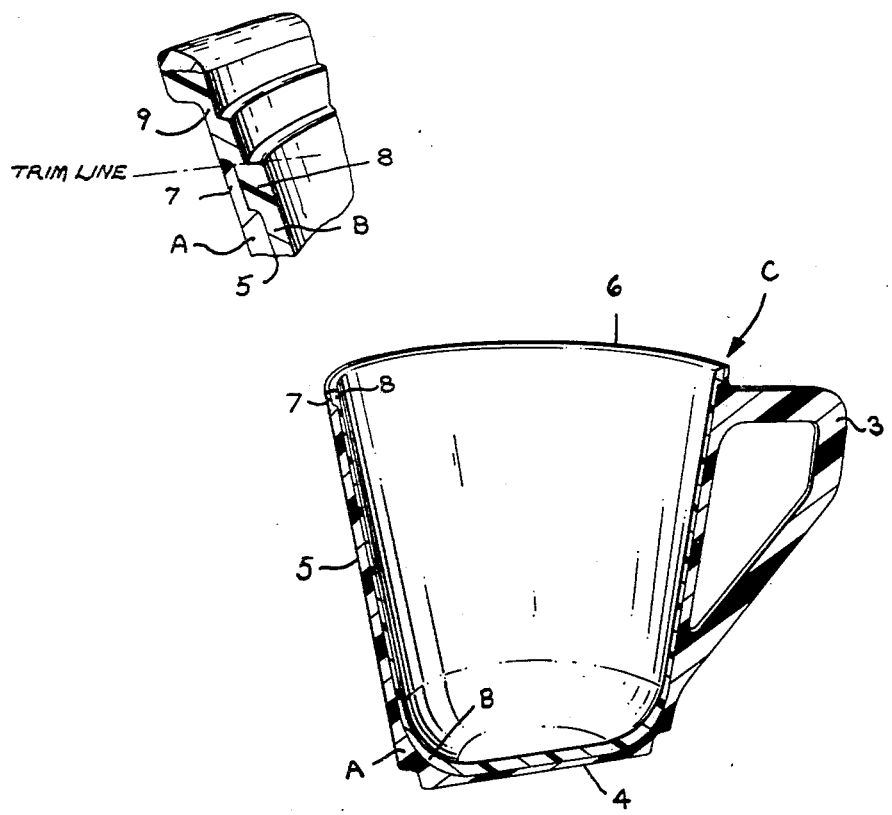
FIGURE 5 is a perspective view in section of a finished article formed according to the present invention.
FIGURE 6 is an enlarged fragmentary sectional view of the top or rim portion of an article formed according to the present invention prior to trimming the excess material therefrom.

Referring now to FIGURE 5, the article to be molded according to the present invention is a cup generally designated by the letter C. If desired, the cup C may be provided with a handle 3. The cup C includes a bottom 4 and an upwardly and outwardly flaring sidewall 5 terminating at its upper end in an annular rim 6. The cup C has an outer or exterior wall A which is formed during the molding of the first layer of plastic molding compound and an inner or interior wall B which is formed during the molding of the second layer of plastic molding compound. For reasons which will become readily apparent from the following description, the upper portion of the sidewall 5 in the area adjacent the top of the rim 6 is formed so that the exterior wall A is substantially thinner than it is throughout the remainder of the sidewall 5. In contrast, the interior wall B in this area is substantially thicker than it is throughout the remainder of the sidewall 5. For purposes of clarity, the rim 6 should be understood to mean the entire area of the sidewall having the thinner exterior wall A and the thicker interior wall B. The exterior wall portion of the rim 6 is hereinafter referred to as the lip 7 and the interior wall portion of the rim 6 is hereinafter referred to as the shoulder 8.

As shown in FIGURE 6, the cup C is formed with an excess or waste portion 9 which is removed in a separate operation by trimming flush with the top of the shoulder 8.

Referring now to the other figures, the apparatus for forming the cup C comprises a female mold section generally designed by the numeral 10 comprising partible halves 10' and 10" which cooperate to define a cavity having a molding surface corresponding to the desired external configuration of the article to be molded. A plunger generally designated by the numeral 20 is sized to be received within the cavity of the female mold section 10. The plunger has an external molding surface having a configuration corresponding to the desired interior configuration of the article to be molded.

The female mold section 10 has a cavity defined by a bottom wall 12 and an annular sidewall 14 which tapers upwardly and outwardly from the bottom wall 12. If desired, the mold section 10 may be formed with a convex transition area 16 between the bottom wall 12 and sidewall 14. The sidewall 14 terminates at the upper end in a radially-outwardly directed ledge 18. Extending upwardly from the ledge 18 is a vertical wall portion 22 which is parallel to the longitudinal axis of the cavity. Inasmuch as the cavity of the mold section 10 illustrated in FIGURES 1 through 4 has a circular cross-sectional configuration, the sidewall 14 defines a frustum of a cone and the vertical wall portion 22 defines a cylinder. However, it should be understood that it is within the contemplation of the present invention that other cross-sectional configurations could be used. Additionally, the mold section 10 is provided with a handle cavity 24 in which the handle 3 of cup C is molded. It is because of the handle cavity 24 that the mold section 10 is formed with partible halves 10' and 10''. Upon completion of the molding operation, the halves 10' and 10'' are opened to permit removal of the handled cup C from the mold section 10. Any desired power means (not shown) may be utilized for opening and closing the partible halves 10' and 10''.

Figure 7:
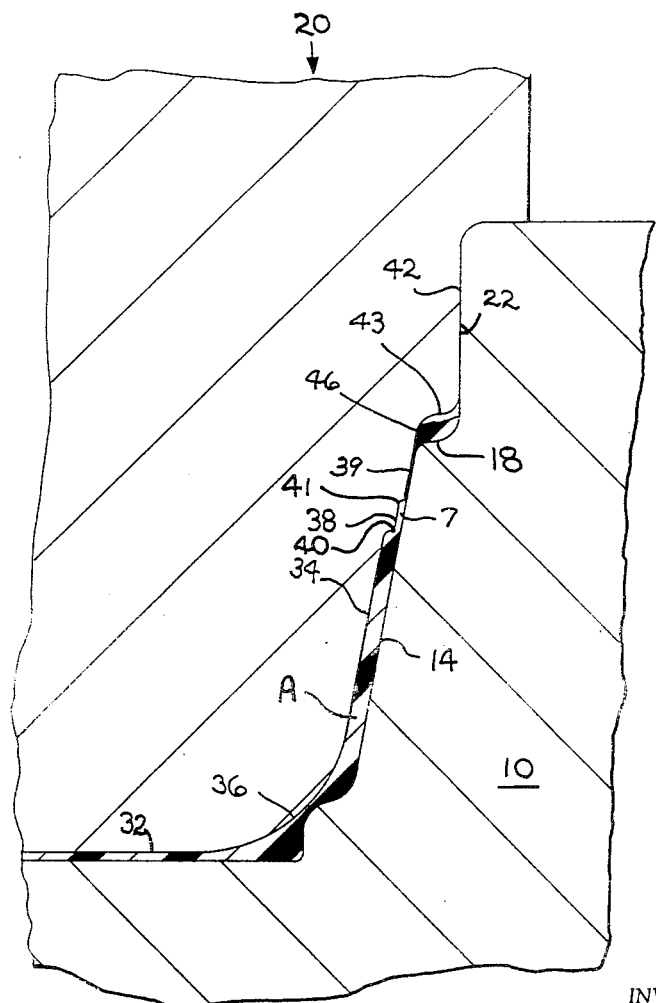
FIGURE 7 is an enlarged fragmentary sectional view of a mold for forming a handleless article according to the present invention showing the plunger in position to mold the first layer of plastic forming the outer wall of the article.
Figure 8:
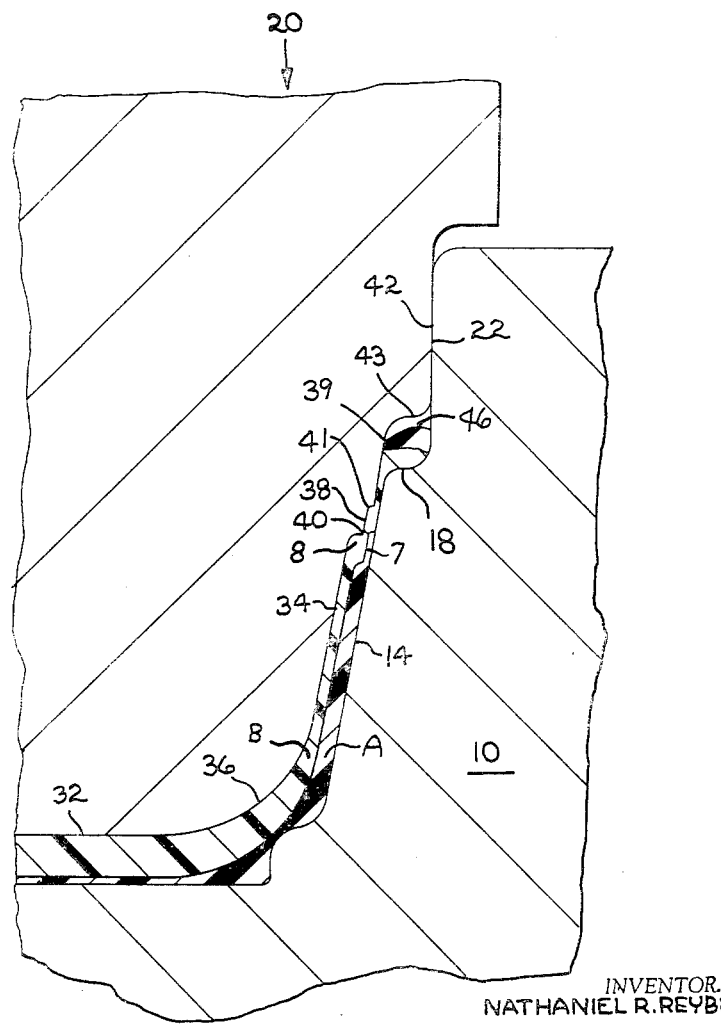
FIGURE 8 is a view similar to FIGURE 7 showing the plunger in position to mold the second layer of plastic forming the inner wall of the article.

In order to assure that the partible halves 10' and 10'' are precisely aligned upon closing, it is desirable to form the one half 10' with a tapered tongue 26 sized to be received in a corresponding groove 28 of the mating half 10''. Referring to FIGURES 7 and 8, where it is desired to form a handleless cup, it is preferred to form the female mold section 10 as a unitary non-partible unit.

The plunger 20 has a substantially horizontal bottom molding surface 32, and a first annular sidewall 34 which tapers upwardly and downwardly substantially parallel to the sidewall 14 of the mold section 10. The bottom molding surface 32 and the first annular sidewall 34 are joined by a radius portion 36. Additionally, there is provided a second tapering annular sidewall portion 38 and a third tapering annular sidewall portion 39. The second tapering annular sidewall 38 is above and radially outwardly from the first annular sidewall 34 and is joined thereto by a first radially outwardly extending ledge 40. Similarly, the third tapering annular sidewall 39 is above and radially outwardly from the second tapering annular sidewall 38 and is joined thereto by a second radially outwardly extending ledge 41.

Figure 1:
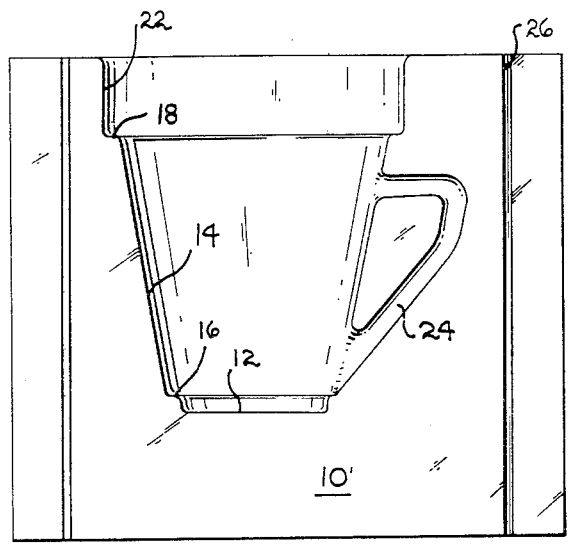
FIGURE 1 is an elevational view of one-half of a partible female mold section in which a handled cup-like article may be molded.
Figure 2:
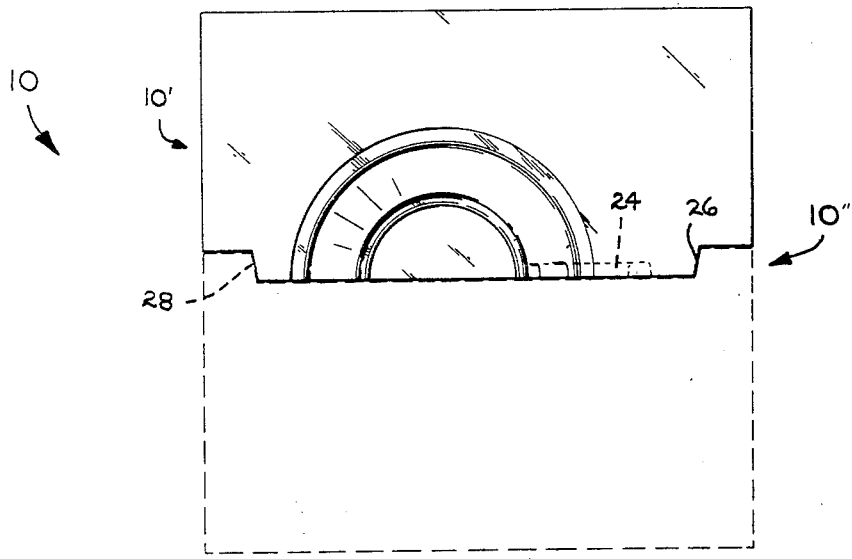
FIGURE 2 is a top plan view of the mold section illustrated in FIGURE 1. The other half of the partible female mold section is shown in dotted lines to illustrate a complete female mold section.
Figure 3:
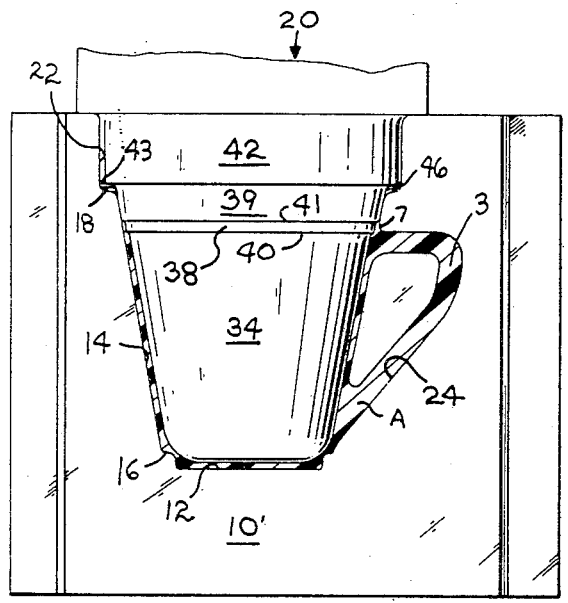
FIGURE 3 is a view similar to FIGURE 1 showing a plunger positioned in the female mold section in position to mold the first layer of plastic which will form the outer or exterior wall and the handle of the article.

The plunger 20 has an upper sidewall 42 sized to be snugly received in the vertical wall portion 22 of the female mold section 10. The upper sidewall 42 and the third tapering sidewall are joined by a third radially outwardly extending ledge 43. As shown in FIGURES 3 and 7, the mold section 10 and the plunger 20 are sized so that the third sidewall portion 39 of the plunger substantially contacts the upper portion of the sidewall 14 upon the complete insertion of the plunger in the mold section 10. The term "substantially contact" for the purpose of this description is understood to mean that a very slight gap, on the order of a few thousandths of an inch, may exist between the third tapering sidewall portion 39 and the sidewall 14 of mold section 10 when the plunger is fully inserted in said mold section, such gap being for the purpose of permitting the escape of any excess plastic molding material; however, the gap is sufficiently small that substantial pressure builds up upon the molding of the plastic material in order to completely fill the molding cavity including handle cavity 24 in the case of the embodiment of FIGURES 1 through 4.

When the plunger 20 is fully inserted in the mold section 10, these elements cooperate to define a molding cavity corresponding to the desired configuration of the exterior wall and an overflow receiving chamber 46. See FIGURES 3 and 7.

Figure 4:
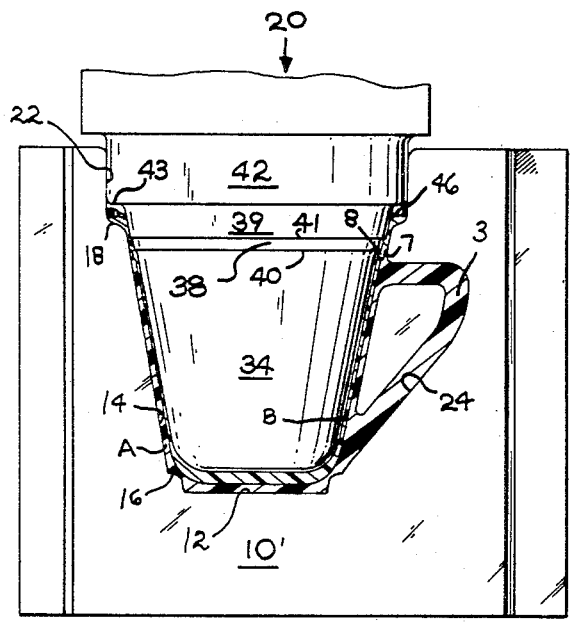
FIGURE 4 is a view similar to FIGURE 3 showing the plunger positioned to mold the second layer of plastic which forms the inner or interior wall of the article.

FIGURES 4 and 8 illustrate the positioning of the plunger 20 with respect to the mold section 10 during the molding of the second layer of plastic forming the interior wall B.

It is desirable that none of the material used in forming the exterior wall A be on the interior of the finished cup C and that none of the material used in forming the interior wall B be on the exterior of the finished cup C. This is especially true where different color plastic is used for forming walls A and B. This feature is achieved by molding the second or inner layer forming interior wall B in accordance with the following procedure. After the molding of the first layer wherein the plastic material fills the molding cavity forming the exterior wall A, with any excess flowing through the small gap between the third annular sidewall 39 of the plunger and the annular sidewall 14 of the mold into the overflow receiving chamber 46, the plunger 20 is removed from the mold 10, a second charge of molding compound is inserted in the mold 10 on the first or exterior wall A and plunger 20 reinserted. The plunger 20 is then lowered to a position such that the first radially outwardly extending ledge 40 is aligned axially with the lip 7 of the exterior wall A. In other words, the first radially outwardly extending ledge 40 during the molding of the second or interior wall B is axially above the position occupied by it during the molding of the first or exterior wall A but is below the position occupied by the second radially outwardly extending ledge 41 during the molding of the first or exterior wall A.

Such positioning of the plunger 20 during the molding of the second or interior wall B serves a multiple advantage. Firstly, it permits the attainment of the desired objective of providing a double wall cup in which one wall is confined solely to the exterior and the other is confined solely to the interior while permitting the trimming operation to be accomplished by cutting through a relatively thin section of plastic, thinner than the overall wall thickness of the finished cup. Thus, in the finishing operation wherein the excess or waste portion 9 is removed from the top of the cup C at the Trim Line (FIG. 6), it is necessary only to cut through a section having a thickness, as illustrated in FIGURE 8, from the second annular sidewall 38 to the mold sidewall 14. In contrast, the attainment of the same objective would require cutting the full wall thickness extending from the first annular sidewall 34 to the mold sidewall 14 of the first radially outwardly extending ledge 40 were positioned axially above the lip 7 during the molding of the second or interior wall B. Additionally, the present method permits the trimming to be done precisely at the top of the shoulder 8 thereby taking advantage of the rounded or radiused corner molded into the shoulder 8 at the juncture of the sidewall 5 and the top of the rim 6. Thus, if the trimming were done below the top of the shoulder 8, a separate buffing operation would be required to remove the sharp corner on the inner edge of the rim resulting from such trimming.

As previously noted and as illustrated in FIGURES 3 and 7, the molding of the first or exterior wall A results in the excess plastic molding compound flowing into the overflow receiving chamber 46. Inasmuch as such excess is joined to the exterior wall A by a very thin section, on the order of a few thousandths inch, corresponding to the gap between the plunger third annular sidewall 39 and the mold section sidewall 14 (FIGURES 3 and 7) it usually will be broken away from such exterior wall A during the molding of the second or interior wall B. See FIGURES 6 and 8.

The present invention can be utilized in molding thermosetting molding compounds or thermoplastic resins of the type contemplated in United States Reissue Patent 25,534.

It can be seen from the foregoing that the present invention provides an efficient and economical method for forming double wall cup-shaped articles. Additionally, it provides an intermediate molded article wihch can be worked to the finished article with a minimum of operations, namely trimming with no necessity of buff or grinding the inner of the rim. Furthermore, it provides a double wall cup-shaped article in which the exterior wall at the rim is substantially thinner than the remainder of the exterior wall lying in the sidewall area of the article.

I claim:

1. In the method of forming plastic cup-shaped articles having two layers in a mold which includes (a) a female mold section having (1) a bottom portion, (2) a sidewall portion extending upwardly and outwardly therefrom about an axis, said sidewall portion extending to a height axially above the top of the finished article and (3) a shoulder extending outwardly from the top of said sidewall portion and (b) a plunger having (1) a first sidewall portion flaring upwardly and outwardly and terminating at its upper end in a first outwardly extending ledge (2) a second sidewall portion flaring upwardly and outwardly from said first ledge and terminating at its upper end in a second outwardly extending ledge, and (3) a third sidewall portion flaring upwardly and outwardly from said second outwardly extending ledge, the steps of placing a first charge of plastic molding material in said female mold section, said first charge being in excess of that required for the outer layer, positioning said plunger in the female mold section to a position where said third sidewall portion substantially contacts the sidewall portion of said female mold section to mold an outer layer and to squeeze the excess molding material to a position remote from the cavity thus defined by the plunger and the female mold section, withdrawing the plunger and placing a second charge of molding material in the female mold section in contact with the newly molded outer layer, repositioning the plunger in the female mold section to mold an inner layer in intimate contact with said outer layer, the position of the first outwardly extending ledge during the step of molding the inner layer being axially below the position of the second outwardly extending ledge during the step of molding the outer layer, and trimming the article along the ledge formed by said first outwardly extending ledge during the step of molding the inner layer.

2. The method as defined in claim 1 wherein said second charge of molding material is in excess of that required for the inner layer.

References Cited

UNITED STATES PATENTS

| | | | |
|---|---|---|---|
| 2,364,388 | 12/1944 | Purinton | 264—161 X |
| 3,309,448 | 3/1967 | Schilling | 264—255 X |
| 3,357,056 | 12/1967 | Reyburn | 264—250 X |

FOREIGN PATENTS

| | | |
|---|---|---|
| 245,322 | 6/1963 | Australia. |

ROBERT F. WHITE, Primary Examiner

A. M. SOKAL, Assistant Examiner

U.S. Cl. X.R.

264—246, 255